(12) United States Patent
Cruz

(10) Patent No.: US 7,211,628 B2
(45) Date of Patent: *May 1, 2007

(54) PLASTIC COMPOSITION

(75) Inventor: Carlos Alfonso Cruz, Holland, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/273,119

(22) Filed: Nov. 14, 2005

(65) Prior Publication Data

US 2006/0069206 A1    Mar. 30, 2006

Related U.S. Application Data

(62) Division of application No. 10/462,111, filed on Jun. 13, 2003, now Pat. No. 7,009,003.

(60) Provisional application No. 60/414,602, filed on Sep. 30, 2002.

(51) Int. Cl.
  C08L 77/00   (2006.01)
  C08L 67/00   (2006.01)
  C08L 69/00   (2006.01)

(52) U.S. Cl. .............. 525/133; 525/146; 525/166; 525/176; 525/179; 525/182; 525/183

(58) Field of Classification Search .......... 525/166, 525/176, 179, 182, 183, 146, 133
See application file for complete search history.

(56) References Cited

U.S. PATENT DOCUMENTS

| | | | |
|---|---|---|---|
| 4,560,714 A | 12/1985 | Gajria et al. ............... 523/409 |
| 5,212,273 A | 5/1993 | Das et al. ................ 526/323.1 |
| 5,270,380 A | 12/1993 | Adamson et al. | |
| 5,863,996 A | 1/1999 | Graham ................... 526/216 |
| 6,268,222 B1 | 7/2001 | Chandler et al. ........... 436/523 |
| 6,329,446 B1 | 12/2001 | Sacripante et al. ......... 523/161 |
| 6,423,760 B1 | 7/2002 | Qiao et al. | |
| 6,852,800 B2 * | 2/2005 | Cruz et al. .................. 525/86 |
| 2002/0065208 A1 | 5/2002 | Aubay et al. ............... 510/475 |
| 2003/0059599 A1 | 3/2003 | Beckley et al. | |

FOREIGN PATENT DOCUMENTS

| | | |
|---|---|---|
| EP | 0436080 | 7/1991 |
| EP | 1153936 | 11/2001 |
| EP | 1167440 | 1/2002 |
| EP | 1245643 | 10/2002 |
| WO | WO 93/00376 | 1/1993 |
| WO | WO 93/24534 | 12/1993 |
| WO | WO 01/43859 | 7/1998 |
| WO | WO 99/01522 | 1/1999 |
| WO | 0052097 | 9/2000 |
| WO | WO 00/59951 | 10/2000 |
| WO | WO 00/75244 | 12/2000 |
| WO | 0242347 | 5/2002 |

OTHER PUBLICATIONS

Dieter Horn and Jens Rieger, "Organic Nanoparticles in the Aqeous Phase—Theory, Experiment, and Use", Agnew, Chem. Int. Ed. 2001, 40, pp. 4330-4361.

* cited by examiner

Primary Examiner—Ana Woodward
(74) Attorney, Agent, or Firm—Karl F. Stauss; Thomas S. Deidert

(57) ABSTRACT

A plastic composition including polymeric nanoparticles having a diameter of 1 to 100 nanometers, and a polymeric component. Also provided is a method for providing such a plastic composition.

5 Claims, No Drawings

PLASTIC COMPOSITION

This non-provisional application is a divisional of non-provisional U.S. patent application Ser. No. 10/462,111, filed Jun. 13, 2003, now allowed, priority benefit of which is claimed under 35 U.S.C. § 120 and which in turn claims benefit under 35 U.S.C. § 119(e) of U.S. provisional Application No. 60/414,602, filed Sep. 30, 2002, priority benefit of which is also claimed for the present divisional application.

This invention relates to an improved plastic composition. In particular, this invention relates to an improved plastic composition comprising polymeric nanoparticles having a diameter of 1 to 100 nanometers. The composition of this invention is improved in at least one property relative to the same composition absent the polymeric nanoparticles. This invention also relates to a method method for providing an improved plastic including: forming polymeric nanoparticles having a diameter of 1 to 100 nanometers; and forming a plastic composition including the polymeric nanoparticles.

Plastic materials may be used alone or in combination with other materials to form composites. Because plastics often are brittle or lack in sufficient strength, however, there is a continuing need to increase their mechanical properties.

Polymer particles are useful for modifying the mechanical and melt processing properties of thermoplastic and thermosetting resins. For example, polyvinyl chloride resin and chlorinated polyvinyl chloride resin (hereafter collectively "PVC") has a combination of properties which make it particularly suitable for use as a structural material but suffers from being brittle. Blending PVC with polymer particles having a rubber phase improves the impact strength (e.g., as an impact-modifier). There is a continuing need to improve the properties of polymer particles that are useful as plastics additives.

WO 200075244 discloses binding agents formed by reacting one or more epoxide-functional binding agents with carboxyl functional metal-organic nanoparticles having a mean particle size of 5 to 200 nanometers.

It is desired to provide plastic compositions with at least one improved property. It has now been found that such improvement inheres in plastic compositions which include polymeric nanoparticles having a diameter of 1 to 100 nanometers.

In a first aspect of the present invention there is provided a plastic including polymeric nanoparticles having a diameter of 1 to 100 nanometers.

In a second aspect of the present invention there is provided a method for providing a plastic including: forming polymeric nanoparticles having a diameter of 1 to 100 nanometers; and forming a plastic composition including the polymeric nanoparticles.

As used herein, the following abbreviations shall have the following meanings, unless the context clearly indicates otherwise: C=centigrade; □m=micron; UV=ultraviolet; rpm=revolutions per minute; nm=nanometer; J=joules; cc=cubic centimeter; g=gram; wt %=weight percent; L=liter; mL=milliliter; pphr=parts per hundred parts of resin, by weight; MIAK=methyl iso-amyl ketone; MIBK=methyl iso-butyl ketone; PMA=poly(methyl acrylate); CyHMA=cyclohexylmethacrylate; EG=ethylene glycol; DPG=dipropylene glycol; DEA=diethylene glycol ethyl ether acetate; BzA=benzylacrylate; BzMA=benzyl methacrylate; MAPS=MATS=(trimethoxylsilyl)propylmethacrylate; PETTA=pentaerythriol tetra/triacetate; PPG4000DMA=polypropyleneglycol 4000 dimethacrylate; DPEPA=dipentaerythriol pentaacrylate; TMSMA=trimethylsilyl methacrylate; MOPTSOMS=methacryloxypropylbis(trimethylsiloxy)methylsilane; MOPMDMOS=3-methacryloxypropylmethyl dimethoxysilane; TAT=triallyl-1,3,5-triazine-2,4,6-(1H,3H,5H)-trione; IBOMA=isobornyl methacrylate; PGMEA=propyleneglycol monomethylether acetate; PEGMEMA475=poly(ethylene glycol methyl ether)methacrylate Mw=475; GMA=glycidyl methacrylate; and PGDMA=propyleneglycol dimethacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

The present invention is directed to plastic compositions which include polymeric nanoparticles having a mean particle diameter of 1 to 100 nanometers, preferably from 1 to 50 nm, more preferably from 1 nm to 20 nm. It is further typical that the PNPs have a mean particle diameter of at least 1.5 nm, preferably at least 2 nm.

One method of determining the particle sizes (mean particle diameter) of the PNPs is by using standard dynamic light scattering techniques, wherein the correlation functions are converted to hydrodynamic sizes using LaPlace inversion methods, such as CONTIN.

Typically, the PNPs have a glass transition temperature from −90° C. to 170° C. for the composition in the absence of polymerized multiethylenically unsaturated monomer, as determined by a modulated DSC measurement.

The PNPs of the present invention typically have an "apparent weight average molecular weight" in the range of 5,000 to 1,000,000, preferably in the range of 10,000 to 500,000 and more preferably in the range of 15,000 to 100,000. As used herein, "apparent weight average molecular weight" reflects the size of the PNP particles using standard gel permeation chromatography methods, e.g., using THF solvent at 40° C., 3 Plgel™ Columns (Polymer Labs, Amherst, Mass.), 100 Angstrom (10 nm), 103 Angstroms (100 nm), 104 Angstroms (1 micron), 30 cm long, 7.8 mm ID, 1 milliliter per minute, 100 microliter injection volume, calibrated to narrow polystyrene standards using Polymer Labs CALIBRE™ software.

The polymeric particles, referred to herein as polymeric nanoparticles ("PNPs"), are addition polymers, which contain, as polymerized units, at least one multiethylenically unsaturated monomer and at least one ethylenically unsaturated water soluble monomer. Suitable multiethylenically unsaturated monomers useful in the present invention include di-, tri-, tetra-, or higher multifunctional ethylenically unsaturated monomers, such as, for example, divinyl benzene, trivinylbenzene, divinyltoluene, divinylpyridine, divinylnaphthalene divinylxylene, ethyleneglycol di(meth)acrylate, trimethylolpropane tri(meth)acrylate TMPTMA, diethyleneglycol divinyl ether, trivinylcyclohexane, allyl (meth)acrylate, diethyleneglycol di(meth)acrylate, propyleneglycol di(meth)acrylate, 2,2-dimethylpropane-1,3-di(meth)acrylate, 1,3-butylene glycol di(meth)acrylate, 1,4-butanediol di(meth)acrylate, 1,6-hexanediol di(meth)acrylate, tripropylene glycol di(meth)acrylate, triethylene glycol di(meth)acrylate, tetraethylene glycol di(meth)acrylate, polyethylene glycol di(meth)acrylates, such as polyethylene glycol 200 di(meth)acrylate and polyethylene glycol 600 di(meth)acrylate, ethoxylated bisphenol A di(meth)acrylate, poly(butanediol) di(meth)acrylate, pentaerythritol tri(meth)acrylate, trimethylolpropane triethoxy tri(meth)

acrylate, glyceryl propoxy tri(meth)acrylate, pentaerythritol tetra(meth)acrylate, dipentaerythritol monohydroxypenta (meth)acrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly (vinyl hydro siloxane), poly(phenyl vinyl siloxane), and mixtures thereof.

Typically, the PNPs contain at least 1% by weight based on the weight of the PNPs, of at least one polymerized multiethylenically unsaturated monomer. Up to and including 99.5 weight % polymerized multiethylenically unsaturated monomer, based on the weight of the PNPs, is effectively used in the particles of the present invention. It is preferred that the amount of polymerized multiethylenically unsaturated monomer is from 1% to 80%, more preferably from 1% to 60%, most preferably from 1% to 25%, by weight based on the weight of the PNPs.

Suitable ethylenically-unsaturated unsaturated monomers which may be incorporated as copolymerized units in the polymeric nanoparticle include, but are not limited to: (meth)acrylic acid, (meth)acrylamides, alkyl(meth)acrylates, alkenyl(meth)acrylates, aromatic(meth)acrylates, vinyl aromatic monomers, nitrogen-containing compounds and their thio-analogs, and substituted ethylene monomers.

The PNPs optionally contain, as polymerized units, one or more third monomers that are not multiethylenically unsaturated monomers. Suitable third monomers include $C_1$–$C_{24}$ alkyl(meth)acrylates, such as methyl(meth)acrylate, ethyl (meth)acrylate, propyl(meth)acrylate, butyl(meth)acrylate, isobutyl(meth)acrylate, hexyl(meth)acrylate, cyclohexyl (meth)acrylate, 2-ethylhexyl(meth)acrylate, octyl(meth) acrylate, decyl(meth)acrylate, dodecyl(meth)acrylate, pentadecyl(meth)acrylate, hexadecyl(meth)acrylate, octadecyl (meth)acrylate, and nonadecyl(meth)acrylate, and mixtures thereof. Other suitable third monomers include 2-hydroxyethyl(meth)acrylate, 2-hydroxypropyl(meth)acrylate, 1-methyl-2-hydroxyethyl(meth)acrylate, 2-hydroxybutyl(meth) acrylate; vinyl acetate; vinyl versatate; diisobutylene; vinylaromatic monomers, such as styrene, α-methylstyrene, vinyltoluene, p-methylstyrene, ethylvinylbenzene, vinylnaphthalene, vinylxylenes, and nonylphenoxy propenyl polyethoxylated alcohol. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$)alkyl, ($C_1$–$C_{10}$) alkoxy, carboxy, and the like.

Suitable alkyl(meth)acrylates include, but are not limited to, "low cut" alkyl(meth)acrylates, "mid cut" alkyl(meth) acrylates and "high cut" alkyl(meth)acrylates.

"Low cut" alkyl(meth)acrylates are typically those where the alkyl group contains from 1 to 6 carbon atoms. Suitable low cut alkyl(meth)acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl(meth)acrylates are typically those where the alkyl group contains from 7 to 15 carbon atoms. Suitable mid cut alkyl(meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and mixtures thereof. Useful mixtures include dodecyl-pentadecyl methacrylate ("DPMA"), a mixture of linear and branched isomers of dodecyl, tridecyl, tetradecyl and pentadecyl methacrylates; and laurylmyristyl methacrylate ("LMA").

"High cut" alkyl(meth)acrylates are typically those where the alkyl group contains from 16 to 24 carbon atoms. Suitable high cut alkyl(meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Useful mixtures of high cut alkyl(meth)acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl(meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical company, i.e., ALFOL 1618 and ALFOL 1620, Ziegler catalyzed various NEODOL alcohols from Shell Chemical Company, i.e. NEODOL 25L, and naturally derived alcohols such as Proctor & Gamble's TA-1618 and CO-1270. Consequently, for the purposes of this invention, alkyl(meth)acrylate is intended to include not only the individual alkyl(meth)acrylate product named, but also to include mixtures of the alkyl(meth) acrylates with a predominant amount of the particular alkyl (meth)acrylate named.

The alkyl(meth)acrylate monomers useful in the present invention may be a single monomer or a mixture having different numbers of carbon atoms in the alkyl portion. Also, the (meth)acrylamide and alkyl(meth)acrylate monomers useful in the present invention may optionally be substituted. Suitable optionally substituted (meth)acrylamide and alkyl(meth)acrylate monomers include, but are not limited to: hydroxy ($C_2$–$C_6$)alkyl(meth)acrylates, dialkylamino ($C_2$–$C_6$)-alkyl(meth)acrylates, dialkylamino($C_2$–$C_6$)alkyl (meth)acrylamides.

Useful substituted alkyl(meth)acrylate monomers are those with one or more hydroxyl groups in the alkyl radical, especially those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl(meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or "HPMA."

Other substituted (meth)acrylate and (meth)acrylamide monomers useful in the present invention are those with a dialkylamino group or dialkylaminoalkyl group in the alkyl radical. Examples of such substituted (meth)acrylates and (meth)acrylamides include, but are not limited to: dimethylaminoethyl methacrylate ("DMAEMA"), dimethylaminoethyl acrylate, N,N-dimethylaminoethyl methacrylamide, N,N-dimethyl-aminopropyl methacrylamide, N,N-dimethylaminobutyl methacrylamide, N,N-di-ethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl)acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and mixtures thereof.

Other substituted (meth)acrylate monomers useful in the present invention are silicon-containing monomers such as γ-propyl tri($C_1$–$C_6$)alkoxysilyl(meth)acrylate, γ-propyl tri ($C_1$–$C_6$)alkylsilyl(meth)acrylate, γ-propyl di($C_1$–$C_6$)alkoxy ($C_1$–$C_6$)alkylsilyl(meth)acrylate, γ-propyl di($C_1$–$C_6$)alkyl ($C_1$–$C_6$)alkoxysilyl(meth)acrylate, vinyl tri($C_1$–$C_6$) alkoxysilyl (meth)acrylate, vinyl di($C_1$–$C_6$)alkoxy($C_1$–$C_6$) alkylsilyl(meth)acrylate, vinyl($C_1$–$C_6$)alkoxydi($C_1$–$C_6$) alkylsilyl(meth)acrylate, vinyl tri($C_1$–$C_6$)alkylsilyl(meth) acrylate, and mixtures thereof.

The vinylaromatic monomers useful as unsaturated monomers in the present invention include, but are not limited to: styrene ("STY"), α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$)alkylamino derivatives and the like.

The nitrogen-containing compounds and their thio-analogs useful as unsaturated monomers in the present invention include, but are not limited to: vinylpyridines such as 2-vinylpyridine or 4-vinylpyridine; lower alkyl ($C_1$–$C_8$) substituted N-vinyl pyridines such as 2-methyl-5-vinyl-pyridine, 2-ethyl-5-vinylpyridine, 3-methyl-5-vinylpyridine, 2,3-dimethyl-5-vinyl-pyridine, and 2-methyl-3-ethyl-5-vinylpyridine; methyl-substituted quinolines and isoquinolines; N-vinylcaprolactam; N-vinylbutyrolactam; N-vinylpyrrolidone; vinyl imidazole; N-vinyl carbazole; N-vinyl-succinimide; (meth)acrylonitrile; o-, m-, or p-aminostyrene; maleimide; N-vinyl-oxazolidone; N,N-dimethyl aminoethyl-vinyl-ether; ethyl-2-cyano acrylate; vinyl acetonitrile; N-vinylphthalimide; N-vinyl-pyrrolidones such as N-vinyl-thio-pyrrolidone, 3 methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone and 3,4,5-trimethyl-1-vinyl-pyrrolidone; vinyl pyrroles; vinyl anilines; and vinyl piperidines.

The substituted ethylene monomers useful as unsaturated monomers is in the present invention include, but are not limited to: allylic monomers, vinyl acetate, vinyl formamide, vinyl chloride, vinyl fluoride, vinyl bromide, vinylidene chloride, vinylidene fluoride and vinylidene bromide.

The PNPs may optionally contain other functional groups, which are provided by the polymerization of monomers containing those groups or precursor groups thereof. Functional groups are optionally attached to the PNPs by reacting the ionic group of the PNP with a suitable compound. For example, PNPs containing carboxylic acid groups are modified to contain pendant hydrophilic groups by reacting carboxylic acid groups with a suitable alcohol, such as a capped polyalkylene oxide. Alternatively, functional groups are affixed to the PNPs through non-radical reactions resulting in the formation of ionic or covalent bonds between a modifying compound containing the groups and complementary reactable groups covalently bound to the PNP as taught in U.S. Pat. No. 5,270,380.

The polymeric nanoparticles used in the present invention may be prepared by emulsion polymerization, suspension polymerization, non-aqueous dispersion polymerization, or solution polymerization. By "solution polymerization" herein is meant free radical addition polymerization in an aqueous or nonaqueous medium which is a solvent for the polymer. By "solvent for the polymer" herein is meant that the polymer absent crosslinking would be soluble in the polymerization medium, as may be predicted based on the solubility of a polymer made under the same conditions absent the crosslinking monomer for polymers containing less than about 20 wt. % multi-ethylenically unsaturated monomer or by selection of a polymerization medium based on solubility maps as disclosed herein.

The polymeric nanoparticles may be prepared in a non-aqueous solvent. Examples of such solvents include, but are not limited to: hydrocarbons, such as alkanes, fluorinated hydrocarbons, and aromatic hydrocarbons, ethers, ketones, esters, alcohols and mixtures thereof. Particularly suitable solvents include dodecane, mesitylene, xylenes, diphenyl ether, gamma-butyrolactone, ethyl lactate, propyleneglycol monomethyl ether acetate, caprolactone, 2-heptanone, methylisobutyl ketone, diisobutylketone, propyleneglycol monomethyl ether, decanol, and t-butanol.

The polymeric nanoparticles may be prepared by first charging a solvent heel or, alternatively, a mixture of solvent and some portion of the monomer(s) to a reaction vessel equipped with a stirrer, a thermometer and a reflux condenser. The monomer charge is typically composed of monomer(s), initiator and chain transfer agent, as appropriate. The solvent or solvent/monomer heel charge is heated with stirring under a nitrogen blanket to a temperature from about 55° C. to about 125° C. After the heel charge has reached a temperature sufficient to initiate polymerization, the monomer charge or balance of the monomer charge is added to the reaction vessel over a period of 15 minutes to 4 hours while maintaining the reaction at the desired reaction temperature. After completing the monomer mixture addition, additional initiator in solvent may be charged to the reaction and/or hold periods may be employed.

The polymeric nanoparticles may be prepared by emulsion polymerization. The emulsion polymers useful in the present invention are generally prepared by first charging water and some portion of the monomer emulsion to a reaction vessel equipped with a stirrer, a thermometer and a reflux condenser. Typically, the monomer emulsion is composed of monomer, surfactant, initiator and chain transfer agent, as appropriate. The initial charge of monomer emulsion is heated with stirring under a nitrogen blanket to a temperature of from about 55° C. to about 125° C. After the seed charge has reached a temperature sufficient to initiate polymerization, the monomer emulsion or balance of the monomer emulsion is charged to the reaction vessel over a period of 15 minutes to 4 hours while maintaining the reaction at the desired reaction temperature. After completing the monomer emulsion addition, additional initiator may be charged to the reaction and/or hold periods may be employed.

In the alternative, the emulsion polymerization may be carried out in a batch process. In such a batch process, the emulsion polymers are prepared by charging water, monomer, surfactant, initiator and chain transfer agent, as appropriate, to a reaction vessel with stirring under a nitrogen blanket. The monomer emulsion is heated to a temperature of from about 55° C. to about 125° C. to carry out the polymerization. After completing the monomer emulsion addition, additional initiator in solvent may be charged to the reaction and/or hold periods may be employed.

Suitable polymeric nanoparticles include, for example: HEMA/DEGDMA, MMA/DEGDMA, MMA/MAPS/DEGDMA, MMA/MAPS/PETTA, MMA/MAPS/PPG4000DMA, MMA/MAPS/DPEPA, MAPS/DEGDMA, BA/DEGDMA, MMA/MAPS/TMPTMA, MMA/MAPS/DVB, STY/MAPS/DVB, BA/MAPS/DVB, BA/TMSMA/DVB, BA/MOPTSOMS/DVB, BA/MOPMDMOS/DVB, BA/MAPS/TAT, ALMA/BA/DVB, IBOMA/MAPS/DVB, IBOA/MAPS/DVB, BA/DVB, BA/PGDMA, BA/ALMA, BA/TMPTMA, BA/DPEPA, EHA/DVB, EHA/ALMA, EHA/TMPTMA, EHA/DPEPA, STY/DVB, STY/ALMA, EHA/STY/ALMA, MMA/BA/ALMA, STY/MMA/DVB, MMA/butadiene/STY, MMA/EA/ALMA, BA/ALMA/MATS, STY/MATS/DVB, MMA/BA/MATS, STY/MMA/MATS/DVB, MMA/BA/MATS/ALMA, BzA/TMPTMA, BzA/DVB, IDMA/BzMA and MMA/ALMA/MATS.

Control of particle size and distribution can be achieved by such methods as choice of solvent, choice of initiator, total solids level, initiator level and reaction conditions. Particle sizes were determined using standard dynamic light scattering techniques. All correlation functions were converted to hydrodynamic sizes using LaPlace inversion methods, such as CONTIN.

Initiators useful in the free radical polymerization of the present invention include, for example, one or more of: peroxyesters, dialkylperoxides, alkylhydroperoxides, persulfates, azoinitiators, redox initiators and the like. Useful free radical initiators include, but are not limited to: benzoyl peroxide, t-butyl peroctoate, t-amyl peroxypivalate, cumene hydroperoxide, and azo compounds such as azoisobutylnitrile and 2,2'-azobis (2-methylbutanenitrile). It is preferred that the free radical initiator is t-amyl peroxypivalate. The amount of the free radical initiator used is typically from 0.05 to 10% by weight, based on the weight of total monomer.

Chain transfer reagents may optionally be used to prepare the polymers useful in the present invention. Suitable chain transfer agents include, for example: alkyl mercaptans such as dodecyl mercaptan, and aromatic hydrocarbons with activated hydrogens such as toluene.

The polymeric nanoparticles may also be post-functionalized. Such post-functionalization may be by any techniques known in the art. Post-polymerization functionalization of the nanoparticles may be advantageous, such as in compatiblizing the particles with other ingredients in the plastic composition.

In one embodiment carboxylic acid monomers such as MAA are also present in the nanoparticle preparation, or if mercaptoacetic acid is added to residual double bonds present in the nanoparticles after their polymerization is completed, some degree of dispersancy for fillers, pigments and colorants may also be imparted.

In a similar manner, the multiethylenically unsaturated monomer may be selected from DVB, TVB, and pentaerithritol tetramethacrylate. If it is desired to assure that a significant amount of residual double bonds are present in the nanoparticles, the weight fraction of multiethylenically unsaturated monomer may be increased to 50% or more. This will allow subsequent addition of mercaptoacetic acid or of $H_2S$ or of a PH-containing compound to incorporate additional functionality as noted above. Indeed, when high levels of DVB are employed, the residual double bonds may be epoxidized to provide nanoparticles that can scavenge HCl and thereby serve as stabilizers for PVC.

The polymeric nanoparticles are desirably discrete or unagglomerated and dispersible, miscible or otherwise substantially compatible with/in the plastic composition.

The compatibility of the particles with the balance of the plastic composition is typically determined by a matching of their solubility parameters, such as the Van Krevelen parameters of delta h and delta v. See, for example, Van Krevelen et al., *Properties of Polymers. Their Estimation and Correlation with Chemical Structure,* Elsevier Scientific Publishing Co., 1976; Olabisi et al., *Polymer-Polymer Miscibility,* Academic Press, NY, 1979; Coleman et al., *Specific Interactions and the Miscibility of Polymer Blends,* Technomic, 1991; and A. F. M. Barton, *CRC Handbook of Solubility Parameters and Other Cohesion Parameters,* $2^{nd}$ Ed., CRC Press, 1991. Delta h is a hydrogen bonding parameter of the material and delta v is a measurement of both dispersive and polar interaction of the material. Such solubility parameters may either be calculated, such as by the group contribution method, or determined by measuring the cloud point of the material in a mixed solvent system consisting of a soluble solvent and an insoluble solvent. The solubility parameter at the cloud point is defined as the weighted percentage of the solvents. Typically, a number of cloud points are measured for the material and the central area defined by such cloud points is defined as the area of solubility parameters of the material.

When the solubility parameters of the particle and plastic are substantially similar, the particle will be compatible in/with the plastic and phase separation and/or aggregation of the particle is less likely to occur. It is preferred that the solubility parameters, particularly delta h and delta v, of the particle and plastic are substantially matched.

The polymeric nanoparticles may be used as a dispersion in the polymerization solvent or they may be isolated by, for example, vacuum evaporation, by precipitation into a non-solvent, and spray drying; the isolated nanoparticles may be subsequently redispersed in a medium appropriate for incorporation into a plastic.

The polymeric nanoparticles may be incorporated into a plastic by admixing the particles or a dispersion of the particles with other dissolved or dispersed polymers and/or other plastics adjuvants as are well known to those skilled in the art. Additional components in the plastic composition, such as UV stabilizers, pigments, PVC resin, matting agents, flow aids, processing aids, lubricants, fillers, stabilizers, and the like, may be blended in either powder or liquid form with resin powders. Individual additives, i.e., UV light stabilizer, may be emulsified, added to plastic polymer dispersions and co-spray-dried. Alternatively, emulsified additives, such as pigment dispersions may be added directly to resin powders in a suitable mixing device which allows for the addition of heat and the removal of water. Likewise, PVC wetcake may also be blended with powder or aqueous-based nanoparticle dispersions. Numerous combinations of mixing emulsion-based additives and powders followed by subsequent drying may be envisioned by one skilled in the art.

In one embodiment nanoparticle processing aids may be incorporated into the suspension, solution, gas phase spray or emulsion systems employed for manufacture of plastics such as PVC, before during or after the synthesis of the plastics. The nanoparticles may migrate to the surfaces of such particulate materials and will be carried into the compounding operations therewith. The nanoparticles may be incorporated with other modifiers such as impact modifiers. The compositions of the nanoparticles may also incorporate lubricant-imparting copolymerized monomers such as, for example, n-dodecyl and n-octadecyl methacrylate so that both processing aid and intrinsic lubricity are imparted to the blends.

In another embodiment a pelletized form of the polymeric nanoparticles is envisioned. Such pellets typically find uses in preparing thermoplastic film, sheet, and other various articles. Pellet-forms are typically more desirable than using a powder-form to avoid certain problems common to powders, such as dust formation. Accordingly, powders may be formed into pellets using any suitable plastics pelletization equipment and other various methods known in the plastics processing art. These pellet forming steps may be combined with the mixing step wherein the components of the plastic composition may be compounded (mixed) and pelletized using standard plastics processing equipment.

In one embodiment of the present invention polymeric nanoparticles having a diameter of 1 to 100 nanometers are incorporated in a thermoplastic resin, preferably PVC, at a level of 2–30 pphr to provide improvement in impact strength with improved optical clarity relative to the same PVC composition with conventional impact modifiers. Nanoparticles having a glass transition temperature <25° C., particularly (meth)acrylic homo- or copolymers; butadiene copolymers with other vinyl monomers; or elastomeric compositions, such as, for example, nitrile rubbers, EPDM, and EVA with a particle diameter below 20 nm are preferred.

In one embodiment of the present invention polymeric nanoparticles having a diameter of 1 to 100 nanometers are incorporated into polycarbonate resin composition. Preferably 0.5 to 20 wt %, more preferably 0.5 to 5 wt %, nanoparticles based on resin are used. Preferably, a nanoparticle composition such as (MMA/BA/TMPTMA) predominant in MMA is selected. The polycarbonate plastic composition exhibits improved impact strength relative to the same composition absent the nanoparticles with preservation of polycarbonate clarity.

In one embodiment of the present invention polymeric nanoparticles having a diameter of 1 to 100 nanometers are incorporated into a nylon composition, a poly(butylene terphthalate) composition, a poly(ethylene terephthalate) composition or blends of the above with each other or with other engineering resins, such as polycarbonate. Preferably 0.5 to 20 wt %, more preferably 0.5 to 5 wt %, nanoparticles based on resin are used. Preferably, a nanoparticle composition such as (MMA/BA/carboxylic acid monomer/TMH-NMA); (MMA/BA/GMA/TMPTMA); (MMA/BA/maleic anhydride/TMPTMA); (MMA/BA/DMAEMA/TMPTMA); (STY/carboxylic acid monomer/DVB); (STY/GMA/DVB); (STY/maleic anhydride/DVB); (STY/HEMA/DVB); or (STY/DMAEMA/DVB) is selected. The final compositions exhibit enhanced melt strength and are, therefore, useful to produce articles made by various processing routes, among them, film from tubular film blowing processes, thermoformed parts, injection blow-molded bottles and similar processes where melt strength is requuired.

In one embodiment of the present invention polymeric nanoparticles having a diameter of 1 to 100 nanometers and larger polymeric particles are incorporated into a plastic resin, preferably PVC, the final blend of particles being an impact modifying composition known to those skilled in the art as a dual-mode impact modifier. Preferably 0.5 to 20 wt %, based on resin, particles with 10 to 90 wt % of the particles being polymeric nanoparticles having a diameter of 1 to 100 nanometers are used. Preferably, a nanoparticle composition such as (MMA/BA/TMPTMA) predominant in MMA, EGMA/TMPTMA, or PPGMA/TMPTMA is selected. Without being bound by mechanism it is believed that the nanoparticles may induce shear yielding/microcracks in some plastics, where the second, larger mode may operate in a crack-stopping mode or as a shear-yielding enhancer if it cavitates. The dual mode-impact modifier plastic composition exhibits improved impact strength relative to the same composition absent the nanoparticles.

In one embodiment of the present invention polymeric nanoparticles having a diameter of 1 to 100 nanometers are incorporated into a thermoplastic resin, preferably PVC at a level of 0.1 to 15 pphr, preferably 0.1 to 2 pphr, more preferably 0.1 to 1% pphr, to provide improvement in the melt rheology of the resin, thereby acting as compositions known in the art as processing aids. Nanoparticles having compositions including (meth)acrylic copolymers, optionally with other vinyl monomers, preferably those which contain greater than 70 wt % MMA, and having a weight average molecular weight greater than 500,000 are preferred. The modified resin compositions provide improved clear and transparent extruded and injection molded products.

In one embodiment of the present invention polymeric nanoparticles having a diameter of 1 to 100 nanometers are incorporated into a thermoset resin, preferably liquid-based epoxies or unsaturated polyesters, at a level of 2–30 pphr to provide improvement in impact strength with minimal increase in the viscosity of the overall composition. Nanoparticles having a particle diameter of 1 to 50 mn, preferably 1 to 20 nanometers may be used in transparent gel coats where optical transparency is desired and also in reinforced thermoset composites containing reinforcing fiber.

In one embodiment of the present invention polymeric nanoparticles having a diameter of 1 to 100 nanometers are incorporated into a thermoset resin at a level of 2–30 pphr to provide improvement in low shrinkage and surface smoothness of the cured resin, i.e., functioning as a low profile additive, with minimal increase in the viscosity of the overall composition. Improvement is seen relative to the larger particle size polymeric low profile additives in use.

In one embodiment of the present invention polymeric nanoparticles having a diameter of 1 to 100 nanometers are incorporated into a thermoplastic resin like PVC, at a level of 2 to 30 phr to decrease its thermal expansion coefficient while not modifying other improtant properties of the resin. Regulating the thermal expansion coefficient of a resin can be of improtance not only to control its inehrent tendency to shrink when cooling down form the melt, but also when the resin is coextruded or laminated with other resins, being able to control the respective thermal expansion coefficients can lead to desirable properties or final forms of the products produced by those means.

In one embodiment of the present invention polymeric nanoparticles having a diameter of 1 to 100 nanometers are incorporated into a thermoplastic resin like PVC, at a level of 2 to 50 phr to enhance its heat deflection temperature resistance (HDT). This is important in applications such as siding, hot water pipe and fittings.

In one embodiment of the present invention polymeric nanoparticles having a diameter of 1 to 100 nanometers are incorporated into a thermoset resin at a level of 2–30 pphr to provide improvement in pigmentability of the resin. Improvement is seen relative to larger particle size polymeric additives such as, for example, styrene, poyvinylacetate, acrylic resins, and polyesters currently in use.

In one embodiment of the present invention polymeric nanoparticles having a diameter of 1 to 100 nanometers are incorporated into a plastic resin composition, preferably a polyolefin, to act as a nucleating agent. Preferably 0.01 to 2 wt % nanoparticles based on resin are used. Preferably, a nanoparticle composition incorporating a multifunctional monomer copolymerized with styrene, 4-methylstyrene, isobornyl(meth)acrylate, fluorinated monomers such as ZONYL™ monomers or fluorinated ethylene derivatives, versatic acid unsaturated derivatives such as VEOVA™ monomers, or "medium cut" or "high cut" alkyl (meth) acrylate is selected. The plastic composition exhibits higher crystallinity relative to the same composition absent the nanoparticles.

In one embodiment of the present invention fuctionalized polymeric nanoparticles having complementary functional groups, the complementary functional groups being capable of interaction such as ionic or covalent reaction with each other, the particles having a diameter of 1 to 100 nanometers, are incorporated into a plastic resin composition. Preferably 1 to 20 wt % nanoparticles based on resin are used. Functionalized nanoparticles that are dispersible in resins but have functional groups that can react with one another to form chains of particles for self assembly are selected. This may be accomplished by mixing nanoparticles with functionality "A" (amine, acid) with nanoparticles with complementary functionality "B" (epoxy, anhydride). The bulk of the nanoparticles would include monomers that promote dispersibility in a given plastic resin (e.g., LMA or SMA for polyolefins) in addition to a multi-ethylenically unsaturated monomer, but low levels of functional groups, preferably situated in the outer layer of the particle, would promote interparticle interaction. Alternatively, suitable low-molecular weight functional compounds or functionalized polymers, could be used as assembly-promoters, i.e., be in promoting (macro)network formation. The plastic composition exhibits improved rheology control, and/or reinforcement and/or improved transport properties relative to the same composition absent the nanoparticles.

In one embodiment of the present invention polymeric nanoparticles having a diameter of 1 to 100 nanometers are incorporated into plastic resin such as, for example, polyacrbonate and nylon. Preferably 0.5 to 20 wt %, more preferably 0.5 to 5 wt %, nanoparticles based on resin are used. Preferably, a nanoparticle composition such as (MMA/BA/TMPTMA) predominant in MMA is selected. The particles include a liquid-like or oligomeric substance for crack healing upon polymer fracture (fatigue of polymer structures) as disclosed in *Nature*, Vol. 409, 794 (2001).

The following examples are presented to illustrate further various aspects of the present invention.

EXAMPLE 1

Preparation of Polymeric Nanoparticles

A 500 mL reactor was fitted with a thermocouple, a temperature controller, a purge gas inlet, a water-cooled reflux condenser with purge gas outlet, a stirrer, and an addition funnel. To the addition funnel was charged 201.60 g of a monomer mixture consisting of 18.00 g methyl methacrylate (100% purity), 2.00 g diethyleneglycol dimethacrylate (100% purity), 1.60 g of a 75% solution of t-amyl peroxypivalate in mineral spirits (Luperox 554-M-75), and 180.00 g diisobutyl ketone ("DIBK"). The reactor, containing 180.00 g DIBK was then flushed with nitrogen for 30 minutes before applying heat to bring the contents of the reactor to 75° C. When the contents of the reactor reached 75° C., the monomer mixture in the addition funnel was uniformly charged to the reactor over 90 minutes. Thirty minutes after the end of the monomer mixture addition, the first of two chaser aliquots, spaced thirty minutes apart and consisting of 0.06 g of a 75% solution of t-amyl peroxypivalate in mineral spirits (Luperox 554-M-75) and 2.00 g DIBK, was added. At the end of the second chaser aliquot, the contents of the reactor were held 2½ hours at 80° C. to complete the reaction. The resulting polymer was isolated by precipitation with heptane, collected by filtration and dried under vacuum to yield a white powder. This material was redissolved in propyleneglycol monomethylether acetate. The nanoparticles thus formed had a particle size distribution of from 0.8 to 5.0 nm with mean of 1.4 nm as determined by dynamic laser light scattering and a molecular weight of about 22,642 g/mol with a number average molecular weight of about 14,601 g/mol and Mw/Mn distribution of 1.6 as measured by GPC.

EXAMPLE 2

Preparation of Polymeric Nanoparticles: AAEM/ALMA Copolymer By A Semi-Batch Emulsion Polymerization Process A monomer emulsion was made from a mixture of 17 g deionized water, 8.85 g of 28% w/w solids ammonium lauryl sulfate ("ALS"), 12.4 g acetoacetoxyethyl methacrylate ("AAEM"), and 1.78 g allyl methacrylate ("ALMA"). A reaction kettle was then prepared with 600 g deionized water, 15.0 g of 28% w/w solids ALS, and 0.15 g ammonium persulfate ("APS") in 1 mL deionized water. The reaction kettle was heated to 90° C. while being purged with nitrogen. One half of the monomer emulsion was added to the reaction kettle with stirring at 200 rpm. After 20 minutes, the remaining monomer emulsion was added. The kettle temperature was kept at 90° C. for 30 minutes, cooled to 55° C., and then a solution of 0.02 g t-butyl hydroxy peroxide ("t-BHP") in 1 mL of deionized water and a solution of 0.010 g sodium sulfoxylate formaldehyde ("SSF") in 1 mL of deionized water were added respectively. The reaction was then cooled to ambient temperature and the emulsion was filtered through 400 and 100 mesh sieves respectively.

The sample was isolated from water by freeze-drying to produce a white friable, free flowing powder. The resulting white powder was washed with copious amounts of doubly distilled and deionized water to remove most of the surfactant.

EXAMPLE 3

Preparation of Polymeric Nanoparticles: AAEM/ALMA Copolymer Prepared By A Batch Emulsion Polymerization Process A monomer emulsion was made from a mixture of 17 g deionized water, 8.85 g of 28% w/w solids ALS, 12.4 g AAEM, and 1.78 g ALMA in a bottle. A reaction kettle was then prepared with 600 g deionized water, 15.0 g of 28% w/w solids ALS, and 0.15 g APS in 1 mL deionized water. The reaction kettle was heated to 90° C. while being purged with nitrogen. The monomer emulsion was added all at once to the reaction kettle with stirring at 200 rpm. After 30 minutes, the temperature of the reaction flask was cooled to 75° C., and then a solution of 0.02 g t-BHP in 1 mL of deionized water was added. The reaction was cooled further to 55° C., and a solution of 0.010 g SSF in 2 mL of deionized water was added. The reaction was cooled to ambient temperature and the emulsion was filtered through 400 and 100 mesh sieves respectively.

EXAMPLE 4

Preparation of Polymeric Nanoparticles: Gradual-Add Polymerization Process

A monomer emulsion was made from a mixture of 100 g water, 1.60 g of 28% w/w solids ALS, 68 g ethyl acrylate ("EA"), 17 g methyl methacrylate ("MMA"), 12.5 g divinyl benzene ("DVB"), and 5 g methacrylic acid ("MAA"). A reaction kettle containing 445 g water, 22.2 g of 28% w/w solids ALS and 0.37 g APS was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate (FeSO$_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve.

EXAMPLE 5

Preparation Of Various Polymeric Nanoparticles

Polymeric nanoparticle compositions are reported in Table 5.1. These polymers were prepared according to the general procedures of Examples 1–4. The abbreviation "Mw" refers to the weight average molecular weight and the term "Mn" refers to the number average molecular weight. The term "Dist" refers to the ratio of Mw/Mn. The molecular weights were measured using a standard GPC method with tetrahydrofuran as the solvent.

TABLE 5.1

Polymeric nanoparticle compositions

| Sample 5- | Composition | Ratio | Mw | Mn | Dist |
|---|---|---|---|---|---|
| 1 | HEMA/DEGDMA | 90/10 | | | |
| 2 | MMA/DEGDMA | 90/10 | | | |
| 3 | MMA/DEGDMA | 90/10 | 19073 | 11183 | 1.7 |
| 4 | MMA/DEGDMA | 90/10 | 644 | 221 | 2.9 |
| 5 | MMA/DEGDMA | 90/10 | 771 | 3989 | 1.9 |
| 6 | MMA/MAPS/DEGDMA | 70/20/10 | 10640 | 4254 | 2.5 |
| 7 | MMA/MAPS/DEGDMA | 80/10/10 | 12819 | 8091 | 1.6 |
| 8 | MMA/MAPS/DEGDMA | 60/30/10 | | | |
| 9 | MMA/MAPS/DEGDMA | 40/50/10 | 43667 | 9047 | 4.8 |
| 10 | MMA/MAPS/DEGDMA | 20/70/10 | 166432 | 7404 | 22.5 |
| 11 | MAPS/DEGDMA | 90/10 | 11683 | 3484 | 3.4 |
| 12 | MMA/MAPS | 88.9/11.1 | 15965 | 7424 | 2.2 |
| 13 | BA/DEGDMA | 90/10 | 51007 | 29065 | 1.8 |
| 14 | MMA/MAPS/PETTA | 80/10/10 | | | |

TABLE 5.1-continued

Polymeric nanoparticle compositions

| Sample 5- | Composition | Ratio | Mw | Mn | Dist |
|---|---|---|---|---|---|
| 15 | MMA/MAPS/PPG4000DMA | 80/10/10 | | | |
| 16 | MMA/MAPS/DPEPA | 80/10/10 | | | |
| 17 | MMA/MAPS/TMPTMA | 80/10/10 | | | |
| 18 | MMA/MAPS/DEGDMA | 75/10/15 | | | |
| 19 | MMA/MAPS/DEGDMA | 85/10/5 | | | |
| 20 | MMA/MAPS/DVB | 10/60/30 | 95613 | 12003 | 8.0 |
| 21 | MMA/MAPS/DVB | 20/60/20 | 110422 | 19814 | 5.6 |
| 22 | MMA/MAPS/DVB | 25/60/15 | | | |
| 23 | MMA/MAPS/DVB | 30/60/10 | | | |
| 24 | MMA/MAPS/DEGDMA | 20/70/10 | 35249 | 7438 | 4.7 |
| 25 | MMA/MAPS/DEGDMA | 30/60/10 | 35105 | 7003 | 5.3 |
| 26 | MMA/MAPS/DVB | 10/80/10 | 331732 | 29918 | 11.1 |
| 27 | STY/MAPS/DVB | 30/60/10 | 38455 | 12320 | 3.1 |
| 28 | BA/MAPS/DVB | 30/60/10 | 499094 | 36317 | 13.7 |
| 29 | BA/MAPS/DVB | 10/80/10 | 312848 | 16102 | 19.4 |
| 30 | BA/TMSMA/DVB | 10/80/10 | 674730 | 30989 | 21.8 |
| 31 | BA/MOPTSOMS/DVB | 10/80/10 | 97530 | 12154 | 8.0 |
| 32 | BA/MOPMDMOS/DVB | 10/80/10 | 363561 | 37553 | 9.7 |
| 33 | BA/MAPS/TAT | 10/80/10 | 12201 | 5182 | 2.4 |
| 34 | ALMA/BA/DVB | 10/80/10 | | | |
| 35 | IBOMA/MAPS/DVB | 10/80/10 | | | |
| 36 | BA/DVB | 90/10 | 223436 | 29309 | 7.6 |
| 37 | BA/PGDMA | 90/10 | 26797 | 8242 | 3.3 |
| 38 | BA/ALMA | 90/10 | 104529 | 15967 | 6.5 |
| 39 | BA/TMPTMA | 90/10 | 39638 | 16306 | 2.4 |
| 40 | BA/DPEPA | 90/10 | 103945 | 18702 | 5.6 |
| 41 | EHA/DVB | 90/10 | | | |
| 42 | EHA/ALMA | 90/10 | | | |
| 43 | EHA/TMPTMA | 90/10 | | | |
| 44 | EHA/DPEPA | 90/10 | | | |
| 45 | STY/DVB | 90/10 | | | |
| 46 | STY/ALMA | 90/10 | | | |
| 47 | EHA/STY/ALMA | 20/70/10 | | | |
| 48 | EHA/STY/ALMA | 45/45/10 | | | |
| 49 | MMA/DEGDMA | 90/10 | 22642 | 14601 | 1.6 |

EXAMPLE 6

Preparation Of PVC Composition Containing A Nanoparticle Processing Aid

MMA (90 parts) and TMPTMA (10 parts) mixed with t-amyl peroxypivalate (0.5 parts) are added in the course of 1 hour to MIBK (200 parts) under reflux. Heating is continued for an additional hour to provide a "solution" of the processing aid. The nanoparticles may be isolated and incorporated into a PVC resin to provide improved processing rheology relative to the rheology of the PVC alone.

What is claimed is:

1. A plastic composition comprising a plastic component and 0.5 to 20%, based on the weight of the plastic component, of polymeric nanoparticles; wherein the polymeric nanoparticles are addition polymers that comprise, as polymerized units, 1 to 99.5 wt % of at least one multiethylenically unsaturated monomer and at least one ethylenically unsaturated water soluble monomer; wherein the polymeric nanoparticles have a mean particle diameter of 1 to 20 nm, wherein said plastic component is selected from a nylon component, a poly(butylene terphthalate) component, a poly(ethylene terephthalate) component; blends thereof and blends thereof with another engineering resin.

2. A method for providing a plastic composition according to claim 1, comprising:

a. forming polymeric nanoparticles having a diameter 1 to 20 nanometers; and b. obtaining a plastic component selected from a nylon component, a poly(butylene terphthalate) component, a poly(ethylene terephthalate); blends thereof and blends thereof with another engineering resin; and c. forming a plastic composition comprising said polymeric nanoparticles and said plastic component; wherein the plastic composition comprises 0.5 to 20%, based on the weight of the plastic component, of the polymeric nanoparticles.

3. The plastic composition of claim 1, wherein the engineering resin is a polycarbonate component.

4. The plastic composition of claim 1, wherein the polymeric nanoparticles have a composition selected from MMA/BA/carboxylic acid monomer/TMPTMA; MMA/BA/GMA/TMPTMA; MMA/BA/maleic anhydride/TMPTMA; MMA/BA/DMAEMA/TMPTMA; STY/carboxylic acid monomer/DVB; STY/GMA/DVB; STY/maleic anhydride/DVB; STY/HEMA/DVB and STY/DMAEMA/DVB.

5. The plastic composition of claim 1, wherein the plastic composition comprises 0.5 to 5.0%, based on the weight of the plastic component, of the polymeric nanoparticles.

* * * * *